United States Patent [19]

Beukers et al.

[11] 4,143,335
[45] Mar. 6, 1979

[54] PRESSURE SENSOR INCLUDING A RESISTOR COMMUTATOR FOR PROVIDING UNAMBIGUOUS ATMOSPHERIC PRESSURE DATA

[75] Inventors: John Beukers, Stony Brook, N.Y.; Maurice Friedman, Roslyn; Luken Potts, Merion, both of Pa.

[73] Assignee: Beukers Laboratories, Inc., Bohemia, N.Y.

[21] Appl. No.: 839,211

[22] Filed: Oct. 4, 1977

[51] Int. Cl.² .................. G01L 9/02; H01C 1/012; H01C 10/46; H03B 5/20
[52] U.S. Cl. .................................... 331/65; 73/387; 73/DIG. 6; 331/179; 338/128; 338/194; 338/309
[58] Field of Search .................. 331/65, 179; 338/92, 338/95, 125, 126, 128, 190, 194, 185, 308, 309; 73/384, 386, 387, DIG. 6

[56] References Cited
U.S. PATENT DOCUMENTS

| | | | |
|---|---|---|---|
| 3,019,397 | 1/1962 | Cosby | 331/65 |
| 3,613,042 | 10/1971 | Leerkamp et al. | 338/95 X |
| 3,656,066 | 4/1972 | Reynal | 331/135 X |
| 3,668,930 | 6/1972 | Strauss | 73/386 |

*Primary Examiner*—Siegfried H. Grimm
*Attorney, Agent, or Firm*—Hopgood, Calimafde, Kalil, Blaustein & Lieberman

[57] ABSTRACT

A pressure transducer such as for use in a radiosonde includes a substrate and a plurality of conductive contacts formed thereon. An arm is movable over the contacts in accordance with the sensed ambient pressure. A group of resistors of different values of resistance are operatively connected to the contacts whereby each contact is characterized by a unique value of resistance. The resistance may be connected as the frequency-determining element of an oscillator, such that each unique value of resistance may be converted to a unique corresponding frequency and upon decoding determine which unique contact is operatively connected.

3 Claims, 4 Drawing Figures

PRESSURE SENSOR INCLUDING A RESISTOR COMMUTATOR FOR PROVIDING UNAMBIGUOUS ATMOSPHERIC PRESSURE DATA

The present invention relates generally to sensors, and more particularly to meteorological pressure sensors, where highly accurate data points are required at various times during the measurement period.

The use of weather balloons has become an important routine method in the mapping of atmospheric weather conditions and the prediction of climate conditions. Such atmospheric weather soundings are performed each day at heights from the surface of the earth to 30,000 meters or more from weather stations located around the globe.

To measure atmospheric conditions, a balloon filled with either helium or hydrogen is sent aloft. The balloon carries a radiosonde, which contains a number of sensors for measuring such climatic parameters as temperature and humidity. The temperature and humidity measurements are converted to electrical signals which, in turn, modulate a radio-frequency telemetry transmitter contained in the radiosonde. These meteorological data signals are transmitted to a remote ground station where the signals are received and processed to prepare a profile or map of the selected meteorological conditions at the locations of the radiosonde.

In order for the meteorological information to be useful, accurate information of the altitude of the radiosonde must also be known. For this reason, an additional sensor is provided in the radiosonde to measure the ambient pressure. This pressure information is transmitted to the ground station where it is processed and correlated to determine the altitude of the radiosonde. In the event that incorrect altitude information is derived, the atmospheric profile obtained from the radiosonde data would be distorted and the weather maps produced according to this data would be erroneous.

One widely used method of measuring the altitude of a radiosonde is to provide an aneroid capsule in the radiosonde. The deflection of this aneroid capsule and thus the pressure can be measured by one of the following several techniques:

1. The capsule is connected through an appropriate linkage to the coil of a variable inductance, which is the frequency-determining element of an oscillator. The deflection of the aneroid is related to a change in this inductance and hence is a measure of pressure.

2. The capsule is connected through an appropriate linkage to the plate of a variable capacitance, which is the frequency-determining element in an oscillator. The deflection of the aneroid is related to a change in this capacitance and hence is a measure of pressure.

3. The capsule is connected through an appropriate linkage to the contact arm of a variable resistance, which is the frequency-determining element in an oscillator. The deflection of the aneroid is related to a change in this resistance and hence is a measure of pressure.

4. The capsule is connected through an appropriate linkage to an arm. As the aneroid capsule contracts or expands with changing ambient pressure, the arm is caused to move over a commutator plate. That plate conventionally includes a metallic conductive pattern formed on a nonconductive substrate. As the arm moves across the metallic pattern in accordance with changes in pressure, a signal is produced which is transmitted from the radiosonde to the ground station each time the arm moves to engage a different contact. The number of movements of the arm to engage successive contacts of the commutator plate is converted to a pattern at the ground station, which can be interpreted at the ground station to provide altitude data for the radiosonde.

Each of the four foregoing systems is dependent on the precise measure of the distance of deflection of the aneroid capsule. The first three, however, further depend on the precise encoding of the frequency to an order of 0.1% without regard to environmental conditions and battery voltages, and precise decoding at the ground to realize even an accuracy of 1 millibar in 1000.

In the fourth method of measuring pressure, the specific contact to which the pressure arm has moved into engagement is recognized at the ground station either by knowing the starting contact or by establishing a known contact by using the known reference pattern of the contacts, and then counting the number of contacts over which the arm has moved. This system has proven to be satisfactory in a manually operated system in which the ground station operator is provided with a chart which can be used to convert the pattern indicating the sequence of movement of the pressure arm over the commutator contacts to a representation of the altitude of the radiosonde. For this method of measuring radiosonde altitude to be accurate and effective, the operator must, however, know the number of individual contacts over which the pressure arm has moved.

Because of this last requirement, the use of the conventional pressure measuring apparatus in an automatic radiosonde system could lead to serious errors in pressure (altitude) information in the event the transmission of pressure data is temporarily interrupted as a result, for example, of the turning of the telemetry antenna or frequency drift of the radiosonde transmitter. In addition, errors in pressure information can result from a descending balloon as would be caused by icing of the balloon. In either case this would result in the loss of contact counts, which, in turn, would produce an incorrect and ambiguous pressure indication. That is, in the conventional pressure-measuring system, the individual contact which is being engaged by the pressure arm cannot be unambiguously recognized; as a result, this system cannot be employed with assurance to provide accurate pressure information in an automatic weather measurement system.

It is an object of the present invention to provide a pressure sensor that can be used to provide accurate and unambiguous pressure information.

It is a further object of the invention to provide a pressure sensor for use in a radiosonde in which the contact engaged by the movable pressure arm can be unambiguously identifed even in the event of an interruption of telemetry transmission of a descending balloon.

It is another object of the present invention to provide a pressure sensor of the type described which is relatively low in cost and thus well suited for use in an expendable unit.

The pressure sensor according to the invention includes an insulator plate on which a plurality of spaced contacts are formed. A group of resistors of different values of resistance are connected to these contacts in a predetermined pattern such that a unique value of resistance (which can be converted to frequency) is associated with each of the contacts. An unambiguous and accurate indication of the position of a pressure arm with respect to the contacts is provided.

To the accomplishment of the above and further objects as may hereinafter appear, the present invention relates to an improved pressure sensor as defined in the appended claims and as described in the following detailed specification of a presently preferred embodiment thereof, as considered with the accompanying drawings, in which:

Figure 1:
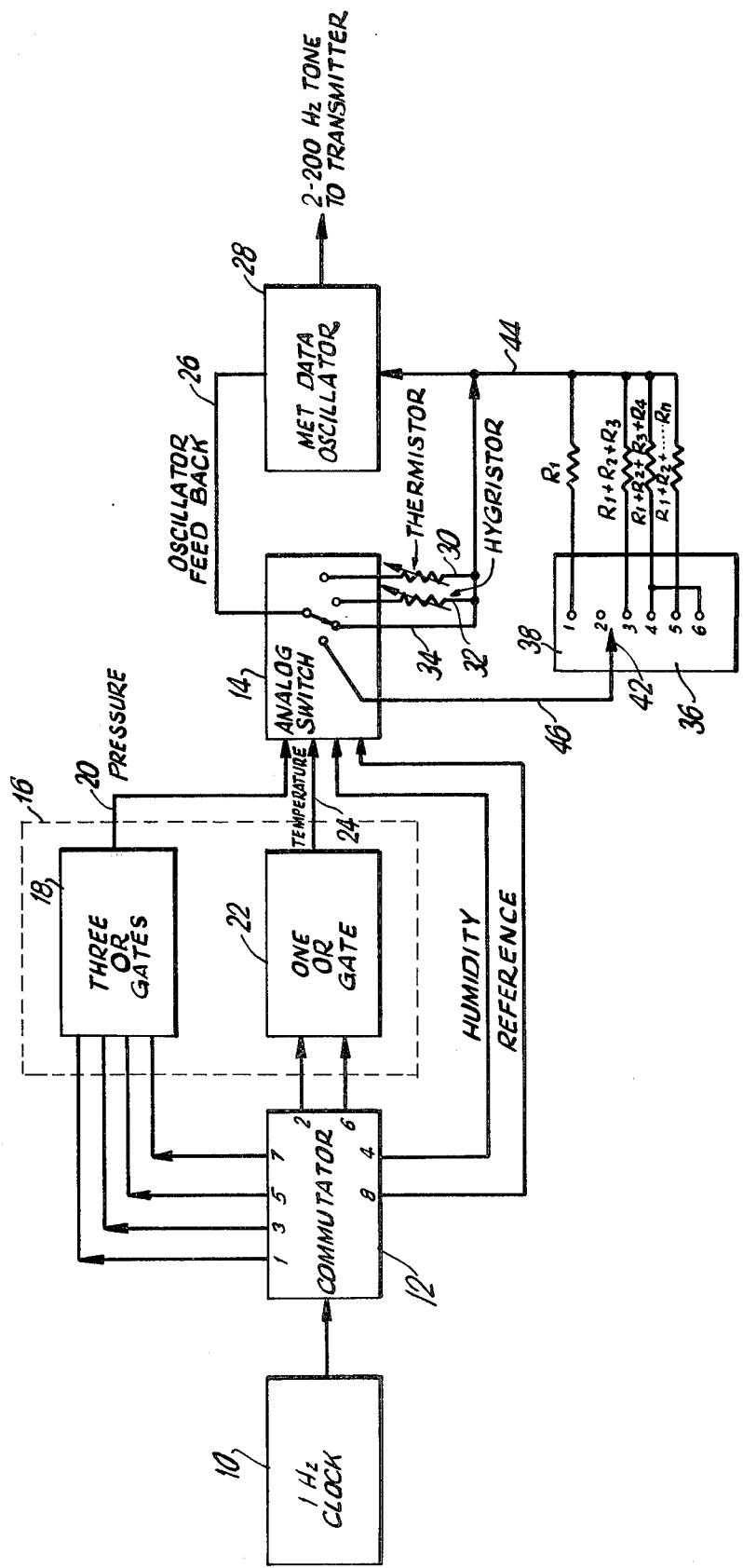
FIG. 1 is a schematic block diagram of a radiosonde which employs the pressure sensor of the invention.

FIG. 1 schematically illustrates a section of a radiosonde that includes the pressure sensor of the invention as well as other weather data sensors, and an encoder that generates the signals that are applied to the telemetry transmitter to transmit meteorological and altitude signals to a remote ground station (not shown). As therein shown, a clock pulse generator 10 supplies control signals of a fixed rate (e.g. 1Hz) to a commutator integrated circuit 12. The commutator 12 provides eight sequentially applied control signals to an analog switch 14 either directly, as in the case of the humidity and reference select signals, or through a quad "OR" gate which consists of three "OR" gates 18, which receive four inputs from commutator 12 and produce on a line 20 a pressure select signal, and a single "OR" gate 22 which produces on a line 24 a temperature select signal.

Each of the four select signals are applied to analog switch 14 and drive one section of the switch, in a known manner, to connect the feedback line 26 of a data oscillator 28 to one of four lines corresponding to pressure (P), temperature (T), humidity (H), or reference (R) according to the following 8-step sequence, in which the numbers refer to the sequence of the output of commutator 12.

1 2 3 4 5 6 7 8 P T P H P T P R

The presence of a select signal at analog switch 14 causes the appropriate sensing circuit to be connected into the feedback loop of the data oscillator 28. Oscillator 28, which may be a relaxation oscillator or CMOS oscillator, is a resistance-to-frequency converter; that is, as is conventional, the output frequency of the oscillator 28 is determined by an integral fixed resistor (not shown) in series connection with a frequency-determining resistor whose value of resistance is, in turn, proportional to a sensed parameter; the resistance is placed into circuit connection by the aforesaid operation of analog switch 14.

Thus, as is conventional, the temperature data is produced by connecting a thermistor 30 in circuit with oscillator 28 such that the oscillator frequency provides a measure of the atmospheric temperature. Similarly, humidity data is produced by connecting a hygristor 32 in circuit with the oscillator 28 such that the oscillator frequency is a measure of atmospheric humidity. When the reference line 34 is connected in series with oscillator 28, through the operation of analog switch 14, a short circuit is created in the oscillator circuit such that the oscillator produces a reference frequency signal which is utilized at the ground station to provide a reference for the weather data signals.

The pressure sensor of the invention, as described in greater detail below, also provides a value of resistance that can be associated with atmospheric pressure. When this pressure resistance is inserted into the oscillator circuit, the oscillator produces a signal having a frequency that is specific to the contact connected. More particularly, in the pressure sensor of the invention, a unique value of resistance is associated with each contact such that a characteristic frequency is produced by the oscillator to which this resistance is connected. This frequency is related to pressure through a pressure/contact calibration chart available on the ground thereby producing an unambiguous and accurate pressure indication for automatic processing.

Figure 2:
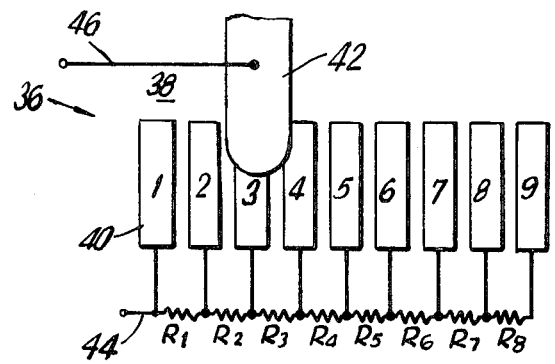
FIG. 2 is a schematic diagram of the pressure sensor of the invention.
Figure 4:
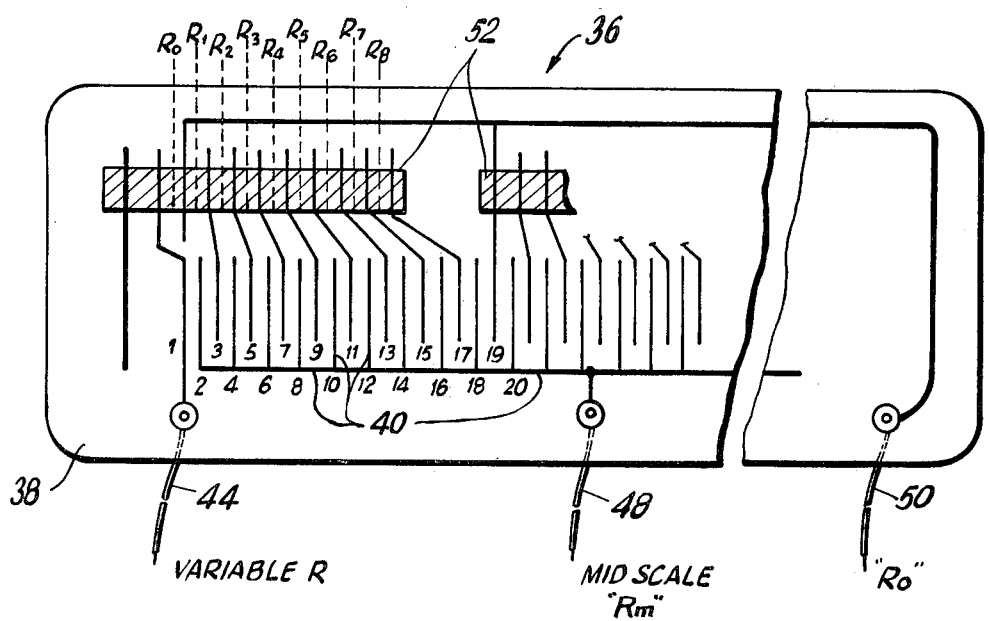
FIG. 4 is a fragmentary elevation of the pressure sensor of the invention.
Figure 3:
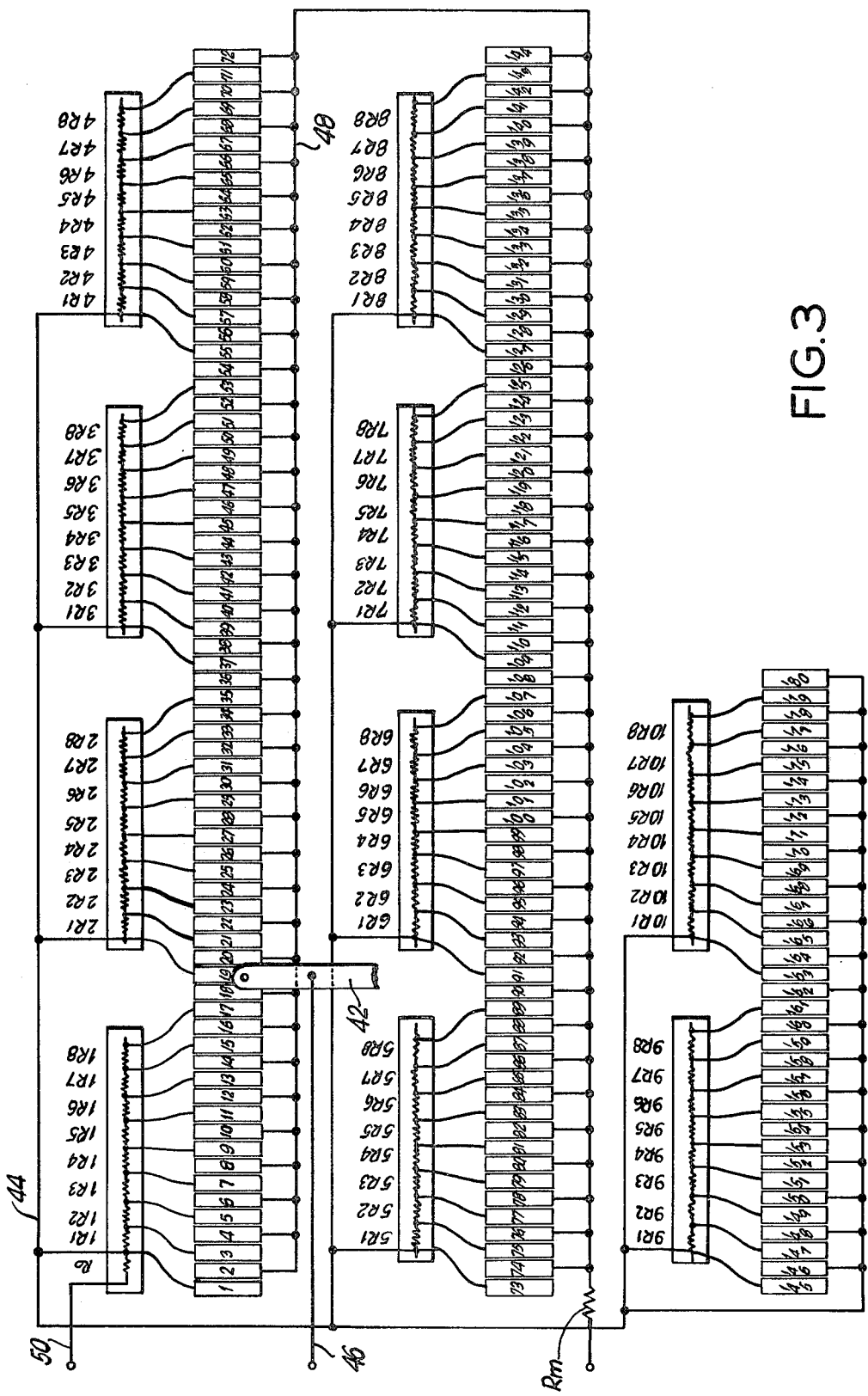
FIG. 3 is a more detailed schematic diagram of the pressure sensor of the invention as employed in a radiosonde.

The pressure sensor of the invention, which is generally designated 36 and illustrated in greater detail in FIGS. 3–4, comprises an insulating plate 38 on which are formed or inlaid a plurality of spaced conducting segments or contacts 40. A plurality of resistors $R_1$, $R_2$ ... $R_n$ are connected between selected pairs of contacts in a manner described below and illustrated in FIGS. 2 and 3. As the arm 42, which is mechanically linked to an aneroid capsule or barometer, moves across the conductive segments 40 in accordance with the atmospheric pressure, a value of resistance corresponding to that particular segment, and thus to the sensed pressure, is connected in circuit with oscillator 28, thereby to cause the oscillator to generate a signal having a frequency that is associated with that segment and thus with the sensed pressure. The construction of the aneroid capsule and linkage are conventional and are not further described therein.

Referring to FIG. 2, which illustrates a nine-segment pressure sensor according to one embodiment of the invention, a group of resistors $R_1$ through $R_8$ are respectively connected between successive pairs of segments 40. Thus, resistor $R_1$ is connected between segment Nos. 1 and 2, resistor $R_2$ is connected between segments Nos. 2 and 3, and so on.

The resistance values of the resistors $R_1$–$R_8$ in the embodiment of FIG. 2 are of successively increasing values, and the nominal resistance value of each of the resistors is selected to ensure that the upper and lower values of each resistor do not overlap the preceding and succeeding resistor in the sequence of resistors when all manufacturing tolerances and temperature effects are considered. Thus, for example, even with the maximum deviation in resistance values commensurate with tolerance and temperature effects, the value of resistance $R_2$ is always higher than that of resistance $R_1$ and lower than that of resistance $R_3$. As a result of this selection of resistor values, the resistance value associated with each of the conductive segments remains unique, as is desired.

As the pressure arm 42 moves along the group of segments 40 with changes in the atmospheric pressure (or altitude), the arm engages different ones of the segments 40. Thus, as shown in FIG. 2, when the arm 42 moves to engage contact 3, the resistance connected across lines 44 and 46 is the sum of resistors $R_1$ and $R_2$. Should arm 42 move with a change in pressure to engage contact 4, the resistance connected across lines 44 and 46 — and thus in circuit with the data oscillator 28 during the pressure-sensing portion of the sequence as determined by the operation of switch 14 — would then be the sum of resistors $R_1$, $R_2$ and $R_3$. Because the previously described selection of the value of these resistors to avoid any possible overlap in their values, the sum of the individual resistances that is connected to the oscillator is different and unique for each of the contacts. As a result, the oscillator 28 produces a signal at a frequency that is unique for each contact.

FIG. 3 illustrates a pressure sensor commutator that may be used to advantage in a radiosonde pressure (altitude) sensor, which incorporates the concept described in FIG. 2. The pressure commutator of FIG. 3 includes a plurality — here ten — of contact and resistor groups. Each group comprises eighteen contacts and eight resistors, $R_1$ through $R_8$, the values of which are respectively the same for each of the ten groups of contacts.

In the sensor illustrated in FIG. 3, the even-numbered contacts 2, 4, 6 . . . 18 of each group of contacts are connected in common and to a mid-reference line 48 and to a precision mid-scale resistor Rm. Resistor Rm is thus connected in circuit with the oscillator each time the arm 42 engages an even-numbered contact in any of the contact groups. Resistance Rm when thus connected with the oscillator provides an accurate frequency reference of the oscillator and preferably has a value of resistance such that the reference frequency is about midway in the range of frequencies achieved as the arm moves over all of the odd-numbered contacts in each group. In this manner, a frequency is generated periodically-every other contact — which can be employed to provide a correction factor for the oscillator resistance-frequency transfer characteristic.

Moreover, in order to calibrate the resistors $R_1$ to $R_8$, a calibration resistor Ro may be, as shown, connected to a line 50 and to the first contact in each contact group, such that a calibrating resistance is placed in circuit with the oscillator at the beginning of each contact group and a corresponding calibrated frequency signal is transmitted to the ground station. This frequency can be employed to correct the resistors $R_1$ to $R_8$ inclusive for temperature drift.

In the pressure commutator of FIG. 3, the resistance pattern is repeated every eighteen contacts such that the frequency signal received at the ground stations that characterizes each of the odd-numbered contacts of each of the eighteen-contact groups is ambiguous with respect to which group that contact belongs. That is, without further information, the ground station data processor could mistake resistor $R_1$ in the first contact group with the resistor $R_1$ in the second, third, or other group.

The possibility of an ambiguous contact indication is avoided by providing the ground station processing equipment with surface pressure data, which, in conjunction with the time and ascension rate of the balloon, removes all ambiguity from the pressure indicator. This manner of identifying the individual contact group which is at a given time providing pressure data is not, by itself, considered to be a part of the present invention, and no further description of this procedure is provided therein.

The construction of the pressure commutator illustrated schematically in FIG. 3 is shown in FIG. 4 as comprising a plastic plate or substrate 38 on which the contacts 40, which are preferably made of gold or silver, are inlaid into the substrate and are equally spaced with the odd-numbered contacts being interposed and extending between the even-numbered contacts. The latter are connected in common and to the mid-scale line 48 which is connected to the mid-scale resistor Rm.

The resistors Ro and $R_1$–$R_8$ in each contact-resistor group are advantageously formed by depositing the resistors onto the substrate by a silk-screen technique as shown at 52. The deposited resistors typically have an accuracy of 30% of their nominal value; the tolerance of the resistors within a given group, made according to this technique, can be maintained to within 12%.

It will be appreciated from the foregoing description of the invention that a pressure sensor is provided in which each contact is unambiguously characterized by a resistance value and hence by a frequency, which can be correlated to an accurate pressure and altitude indication.

Although the invention has been described with respect to several embodiments thereof, it will be apparent that modifications may be made thereon without departing from the spirit and scope of the invention. For example, the mid-range resistor may not be used if a reference frequency is not necessary. Moreover, each group may contain any number of contacts and associated resistances, or a single group with or without reference outputs may be utilized. The calibration resistance may be a pair of shorted wires rather than a precision resistance as described.

What is claimed is:

1. A commutator plate for use with a pressure sensor in which an arm is movable in accordance with the ambient pressure, said plate comprising an insulating substrate, a plurality of spaced conducting segments disposed on one surface of said subtrate over which said arm is movable to engage different ones of said segments in accordance with the ambient pressure, a plurality of resistance means sequentially arranged and operatively connected between selected pairs of said conducting segments, the nominal values of resistance of each of said resistance means being selected such that with the maximum anticipated deviation of the value of resistance of said resistance means from said nominal values the actual value of resistance of each of said resistance means is greater than that of the preceding one of said resistance means and less than that of the following one of said resistance means, whereby a unique value of resistance is unambiguously associated with each of said conducting segments, said resistance means being connected to alternating ones of said conducting segments, and a reference resistor connected to the remaining ones of said conducting segments.

2. The commutator plate of claim 1, in which said resistance means comprises a plurality of resistance portions deposited onto the surface of said substrate.

3. In combination with the commutator plate of claim 1, a variable-frequency oscillator, and means to operatively connect selected ones of said resistance means in circuit with said oscillator in accordance with the position of the arm with respect to said segments.

* * * * *